United States Patent
Fricke et al.

(10) Patent No.: US 7,443,581 B2
(45) Date of Patent: Oct. 28, 2008

(54) ADJUSTABLE OPTICAL CHARACTERISTIC

(75) Inventors: Peter James Fricke, Corvallis, OR (US); Daryl E. Anderson, Corvallis, OR (US); Andrew L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 523 days.

(21) Appl. No.: 11/213,501

(22) Filed: Aug. 26, 2005

(65) Prior Publication Data

US 2007/0047076 A1 Mar. 1, 2007

(51) Int. Cl.
  *G03B 21/56* (2006.01)
(52) U.S. Cl. ........................ 359/443; 345/596
(58) Field of Classification Search ........... 359/443, 359/459; 353/30, 79; 345/596
  See application file for complete search history.

(56) References Cited

U.S. PATENT DOCUMENTS

| | | | |
|---|---|---|---|
| 5,193,015 A | 3/1993 | Shanks | |
| 6,483,643 B1 | 11/2002 | Zuchowski | |
| 6,538,814 B2 | 3/2003 | Hunter | |
| 6,674,579 B2 | 1/2004 | Brennesholtz | |
| 6,680,579 B2 | 1/2004 | Allen | |
| 6,788,469 B2 | 9/2004 | Dewald | |
| 6,816,141 B1 | 11/2004 | Fergason | |
| 6,853,486 B2 | 2/2005 | Cruz-Uribe | |
| 2001/0028501 A1 | 10/2001 | Hunter | |
| 2002/0147861 A1 | 10/2002 | Bui | |
| 2003/0128337 A1 | 7/2003 | Jaynes | |
| 2004/0012849 A1 | 1/2004 | Cruz-Uribe | |
| 2004/0095558 A1 | 5/2004 | Whitehead | |
| 2006/0256124 A1* | 11/2006 | Kuo et al. ................... 345/589 |

* cited by examiner

*Primary Examiner*—Christopher Mahoney

(57) ABSTRACT

Embodiments of adjusting an optical characteristic are disclosed.

23 Claims, 7 Drawing Sheets

ADJUSTABLE OPTICAL CHARACTERISTIC

BACKGROUND

Typical front projection systems may provide images that are less desirable than to those provided by other projection systems. For example, when a front projection system is used in an environment with ambient light (such as a bright room), projected images may be displayed with an undesirably low contrast. Hence, current front projection implementations may provide unacceptable images when used in the presence of ambient light.

BRIEF DESCRIPTION OF DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Various embodiments for adjusting a characteristic, such as an optical characteristic, of subpixels of a screen are described. The subpixels may be utilized to form a projected pixel on the screen. In one embodiment, an optical characteristic (e.g., reflectivity or absorbance) of one or more of the subpixels of the screen is adjustable. Adjusting the optical characteristic of subpixels of the screen may provide a plurality of optical characteristic levels on the screen. Each of the optical characteristic levels may correspond to a grayscale level of the subpixels. Also, adjusting the electrical characteristic of one or more subpixels may increase the refresh rate of the screen.

Figure 1:
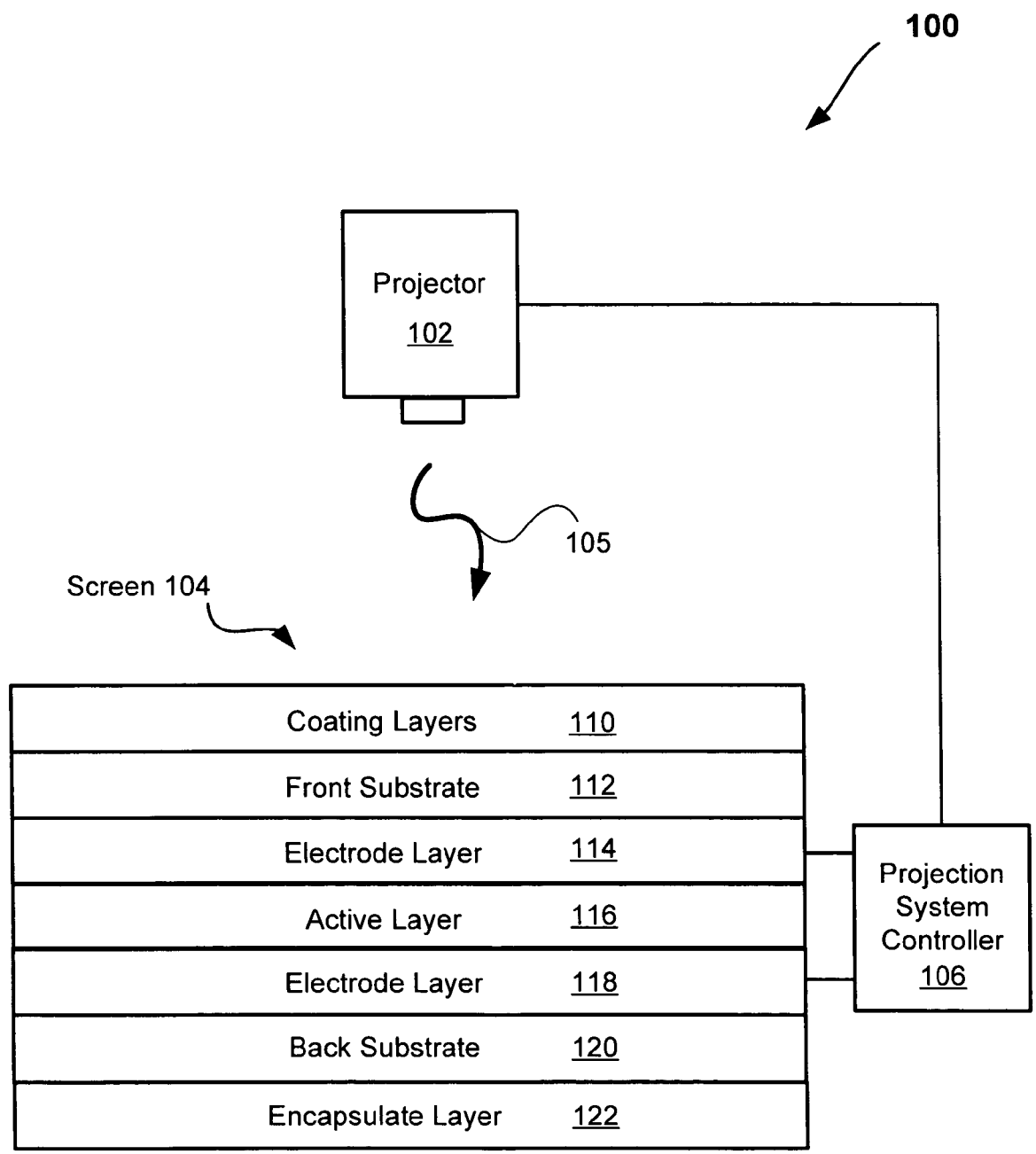
FIG. 1 illustrates a cross sectional block diagram of an embodiment of a front projection system, according to an embodiment.

FIG. 1 illustrates a cross sectional block diagram of an embodiment of a front projection system 100, according to an embodiment. The front projection system 100 includes a projector 102 to project images on an embodiment of a screen, such as a screen 104. The projector 102 may provide visible and/or non-visible light (105) as will be further discussed herein. The screen 104 may be a suitable projection screen such as a rear projection screen or a front projection screen. As illustrated in FIG. 1, the screen 104 (and, in some embodiments, the projector 102) may be coupled to a projection system controller 106. The projection system controller 106 may coordinate the operation of the projector 102 and the screen 104. Also, the projection system controller 106 may control the reset of the screen 104 (e.g., when difficulties are encountered with timing, image projection, and the like), provide and/or condition a power supply (e.g., providing electrical power to the screen 104), and/or establish the timing of the reset. The projector 102 may be any suitable digital projector such as a liquid crystal display (LCD) projector, a digital light processing (DLP) projector, and the like. Moreover, even though FIG. 1 illustrates a front projection system (100), the techniques discussed herein may be applied to a rear projection system. In a rear projection system, the transmissiveness of the screen may be adjusted.

The screen 104 may be an active projection screen with a modifiable optical characteristic, e.g., that is capable of assuming multiple reflectivity and/or absorbance states. The multiple reflectivity and/or absorbance states may provide a higher contrast ratio in the presence of ambient light and/or a color projected on the screen 104 by the projector 102, than would otherwise be obtained, as is further discussed herein.

As illustrated in FIG. 1, the screen 104 may include one or more coating layers 110, a front substrate 112, an electrode layer 114, an active layer 116, an electrode layer 118, a back substrate 120, and an encapsulate layer 122. The coating layers 110 may be one or more layers deposited on the front substrate 112 that may include an antireflective layer such as a suitable anti-glare surface treatment, an ambient rejection layer such as a plurality of optical band pass filters, one or more micro-lenses, and/or a diffusion layer. The front substrate 112 may be an optically clear and flexible material such as Polyethylene Terephthalate (PET or PETE) on which the coating layers 110 are formed. The electrode layer 114 may be formed on the bottom surface of the front substrate 112.

The electrode layer 114 may be one or more suitable transparent conductors such as Indium Tin Oxide (ITO) or Polyethylene Dioxythiophene (PEDOT). In one embodiment, the electrode layer 114 may form the top conductor(s) of the active layer 116.

The active layer 116 may be an optically and/or electrically active layer that responds to the application of light or voltage across itself with a change in its absorbance and/or reflectivity. A number of different active layers 116 may provide such a response. One example includes a polymer dispersed liquid crystal (PDLC) layer in which pockets of liquid crystal material are dispersed throughout a transparent polymer layer. In an embodiment, the active layer 116 may be a continuous dichroic-doped PDLC layer that appears white (or black) in color under a no voltage condition. In an embodiment, an optical sensor may be used to sense non-visible light from the projector 102 and signal the active layer 116 to activate and/or change states. The optical sensor may be located at any suitable location to receive the light from the projector 102, such as around the periphery of the screen 104. As illustrated in FIG. 1, the projector 102 may be coupled to the projection system controller 106 via a wire, e.g., to signal the active layer 116 to activate and/or change states.

In some embodiments, a chemical coating or thin film layer of electrochromic material, such as Tungsten Oxide, or photochromic material, across which an electric field may be selectively applied, may serve as the active layer 116 and may be made photosensitive. The application of a bias across such an electrochromic material active layer (116) (or the addition of the appropriate wavelength of light to the active layer 116 that is light sensitive) may enable the screen 104 to switch from white to gray or white to clear, in which case a gray or black backer may be included. Such an embodiment may include an ITO array type of conductive layer 114 on the front or top of the screen 104 and a second conductive layer (118)

on the opposite side of the active layer near the back layer. The optical response of the screen (104) may be related to the amount of non-visible light hitting the optically active area of the screen (104).

In an embodiment, the electrode layer 118 may be similar to the electrode layer 114 and be positioned on the back substrate 120. An opposite charge may be applied to the electrode layer 118 (e.g., relative to the charge applied to the electrode layer 114). Similarly, the back substrate 120 may be similar to the front substrate 112 in material composition but different in its position at the bottom of the stack of the screen 104, and its relatively darker color (or white if the active material is black in the non-energized state). In one embodiment, the projection system controller 106 selectively applies a voltage across the active layer 116 via the application of opposite charges to the electrode layers 114 and 118. Furthermore, the back substrate 120 (and other portions of the screen 104) may be encapsulated by a protective layer such as the encapsulate layer 122. The selective application of the voltage across the active layer 116 may enable the adjustment of the optical characteristic of the screen (104) over time and/or for a plurality of sections of the screen (104).

In an embodiment, light (105) is projected from the projector 102 and impinges upon the screen 104. The coating layers 110 may serve to reduce specular reflection both in the visible and non-visible range from the screen 104 by implementing an antireflection coating. The coating layers 110 may also serve to absorb and/or deflect a portion of the ambient light that may be generated by extraneous sources other than the projector 102, e.g., by implementing an ambient rejection coating. The coating layers 110 allow a portion of the light incident upon its surface to pass through (partially diffuse) to the layers underlying the coating layers 110.

In one embodiment of front projection system 100, the active layer 116 is a continuous optically active material that is capable of assuming multiple states of reflectivity (or absorbance). Upon receiving an appropriate optical signal, the active layer 116, or a portion thereof (such as one or more pixels), switches between at least two states of reflectivity (or absorbance). With the inclusion of a black layer below active layer 116 (e.g., coated atop electrode layer 118, below electrode layer 118, or atop back substrate 120), the stacked configuration of the projection screen 110 provides a display that may change from off white (or milky white) to black.

In an embodiment, the screen 104 may include white and clear modes (referring to modes of the active layer 116), where clear mode provides a view of the black/dark back layer (120). Alternatively, the screen 104 may include black and clear modes, e.g., the active layer (116) is dyed black or dark gray for absorbance purposes. In this case, a highly reflective back layer (120) may be utilized, rather than a black layer.

In some embodiments, the screen 104 may be modular and segmented into a plurality of pixels (such as further discussed with reference to FIG. 2), the size of which may or may not match the resolution of the projector 102. Such a front projection system (100) may provide enhanced image contrast by selectively changing the reflectance and/or absorbance of either the entirety of the screen 104 and/or sections of the screen 104, e.g., in coordination with projected image modification by the projection system controller 106 and the projected light (105). The front projection system 100 therefore may create relatively deeper black by changing the color of the screen (104) from white to black. Under ambient light conditions, such a system (100) may produce a contrast ratio that may be the multiplicative product of the inherent contrast ratio of the projector 104 and the contrast change made by the screen 104.

Figure 2:
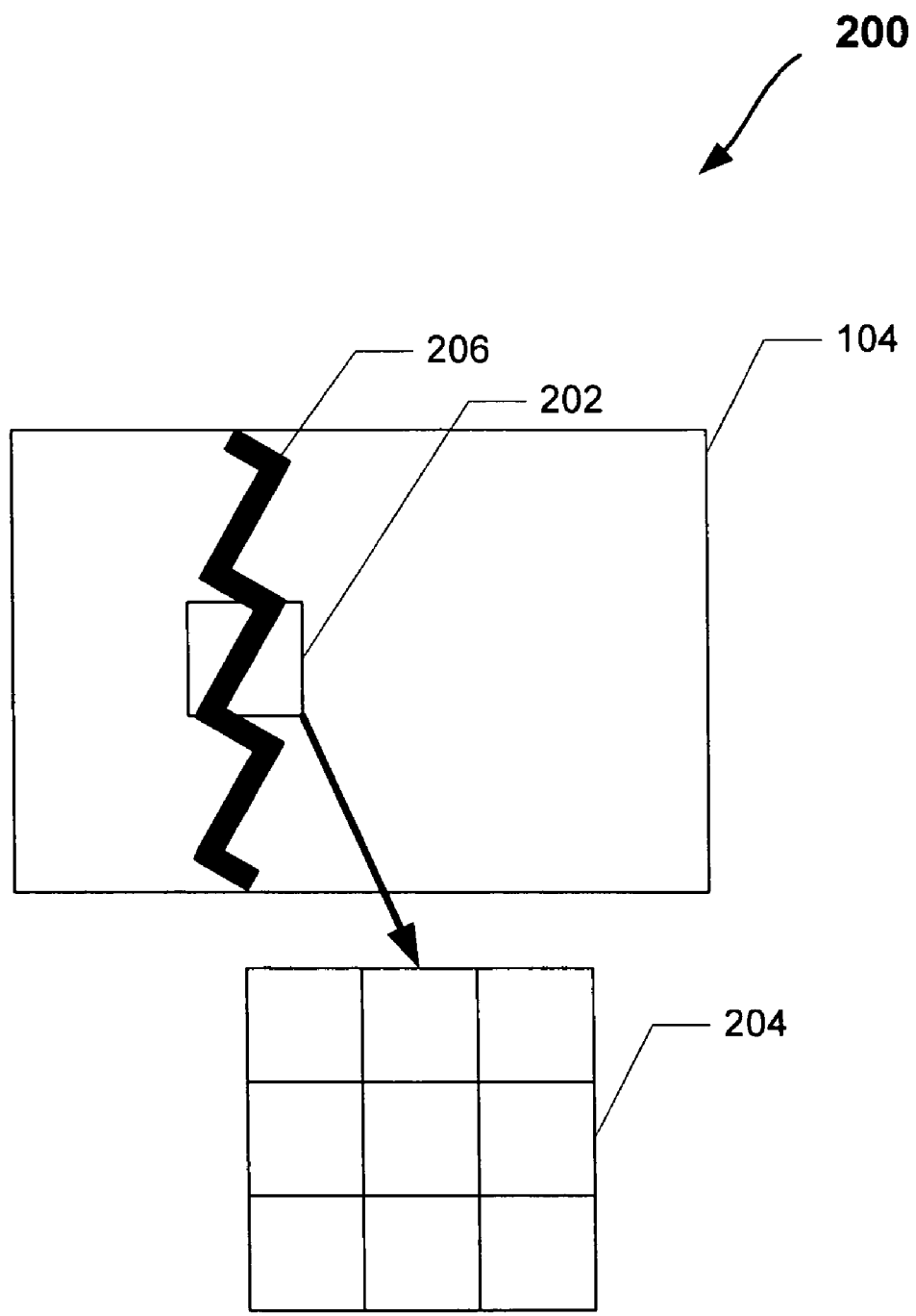
FIG. 2 illustrates a top view of an embodiment of an active screen system, according to an embodiment.

FIG. 2 illustrates a top view of an embodiment of an active screen system 200, according to an embodiment. The system 200 includes the screen 104 (such as discussed with reference to FIG. 1) with one or more pixels (202) formed by projection of light onto screen 104, referred to as projected pixels. A projector (e.g., the projector 102 of FIG. 1) may project a variety of formats onto the screen 104. For example, the projector format may be a super video graphics array (SVGA), e.g., having 800 by 600 projected pixels, super-extended graphics array (SXGA), e.g., with 1280 by 1024 projected pixels, or the like. For a screen that is 2.4 m wide by 1.8 m tall, at a 5 m projection distance, the SVGA format may provide a projected pixel density of about 8.5 projected pixels per inch (PPI) or projected pixel size (PPS) of 3.0 mm×3.0 mm and the SXGA format may provide a projected pixel density of about 13.5 PPI or PPS of 1.9 mm×1.9 mm. At a 10 m projection distance, the SVGA format may provide a projected pixel density of about 4.25 projected pixels per inch (PPI) or PPS of 6.0 mm×6.0 mm and the SXGA format may provide a projected pixel density of about 6.8 PPI or PPS of 3.75 mm×3.75 mm.

Furthermore, each of the projected pixels 202 may be projected over an area of a plurality of subpixels located on screen 104, such as a grid of 3×3 (9) subpixels (204). In an embodiment, each of the projected pixels 202 may be formed by one or more subpixels (204). The subpixels (204) forming the projected pixels (202) may be controlled by applying varying levels of electrical signals to electrodes 206 that are coupled to the subpixels 204. In one embodiment, the subpixels (204) may be dithered to provide a plurality of optical characteristic (e.g., absorbance or reflectivity) levels as discussed herein, e.g., with reference to FIGS. 4-7 and 10. Dithering generally refers to controlling the optical characteristic (e.g., absorbance or reflectivity) levels provided within an area of a screen (such as screen 102) corresponding to a projected pixel (such as projected pixel 202) by controlling the optical characteristics of one or more of the subpixels (such as subpixel 204) included in the projected pixel, such that the unaided human eye perceives desired gray scale levels when viewing the screen. By changing the optical characteristics of the subpixels through dithering, different gray scale levels can be achieved. As discussed with reference to FIG. 1, each optical characteristic level may represent a grayscale level of the subpixels. Each of the subpixels 204 may be coupled to an electrode 206. In one embodiment, the electrode 206 may have a reverse serpentine shape as illustrated in FIG. 2. Each of the subpixels 204 may cover an electrode portion that is about 1 mm wide. For a PDLC capacitance of about 1 nF per ITO line (e.g., in the active layer 116 of FIG. 1), a refresh rate of about 1 kHz may be obtained (e.g., 1/(10*100 k*1 nF), where 100 k is the resistance and 1 nF is the capacitance of the equivalent circuit formed by the active layer 116, and "10" is the number of time constants for the resistor-capacitor (RC) delay calculation, e.g., 10*RC may charge a circuit to about 99.999% of the full charge value and 1*RC may charge a circuit to about 63%). Hence, by adjusting the electrical characteristic of each subpixel (204), the resistance-capacitance (RC) factor of the corresponding portion of the screen (104) may be reduced, thereby enabling the switching (or refreshing) of the screen (104) at a higher frequency.

Figure 3:
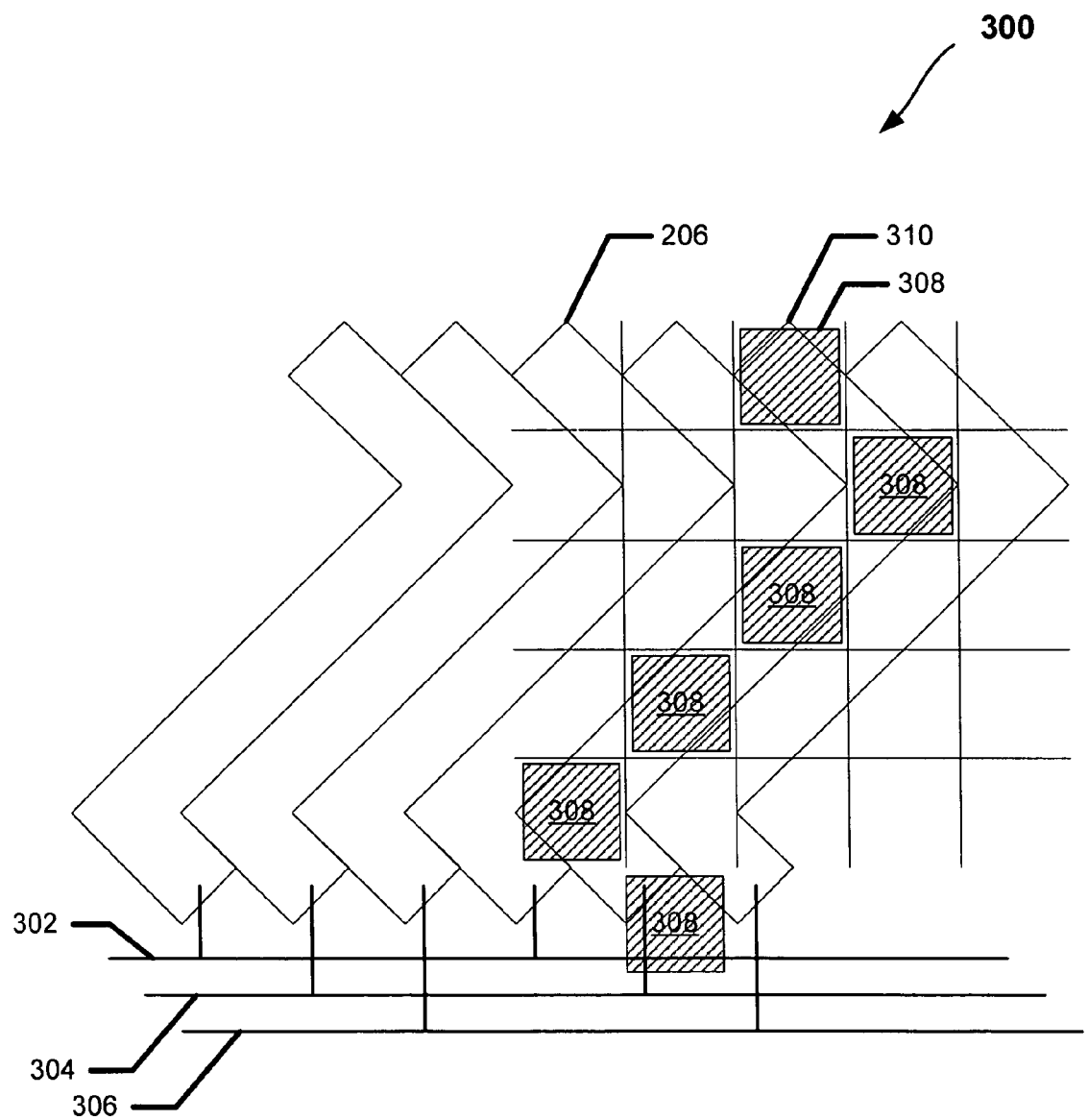
FIG. 3 illustrates a top view of an embodiment of an active screen system with multiple voltage supplies, according to an embodiment.
Figures 4A, 4B:
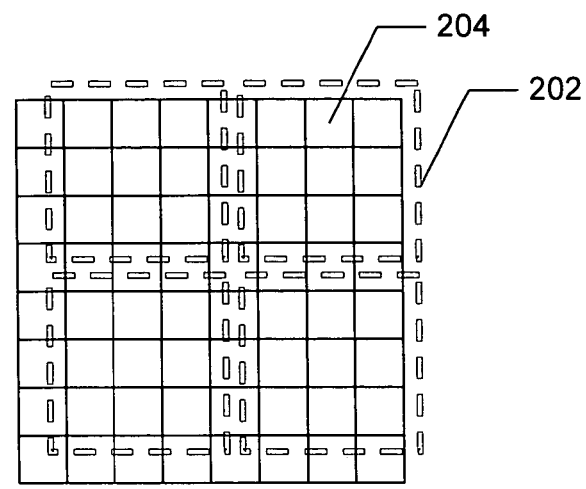
FIGS. 4-7 illustrate an example of enabled voltage sub-pixel grayscale levels and corresponding subpixel dithering, according to various embodiments of the present disclosure.
Figures 5A, 5B:
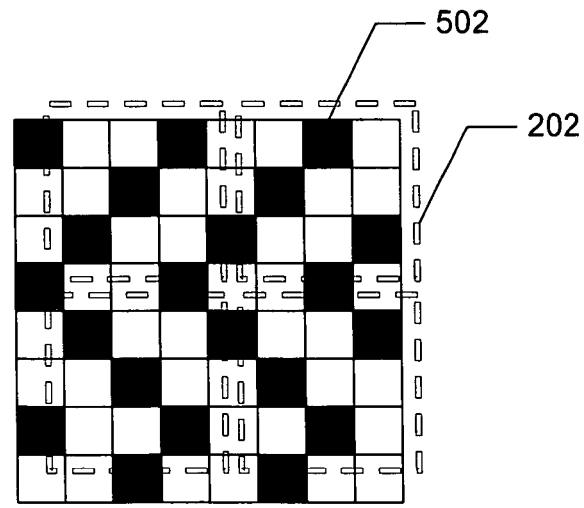
Figures 6A, 6B:
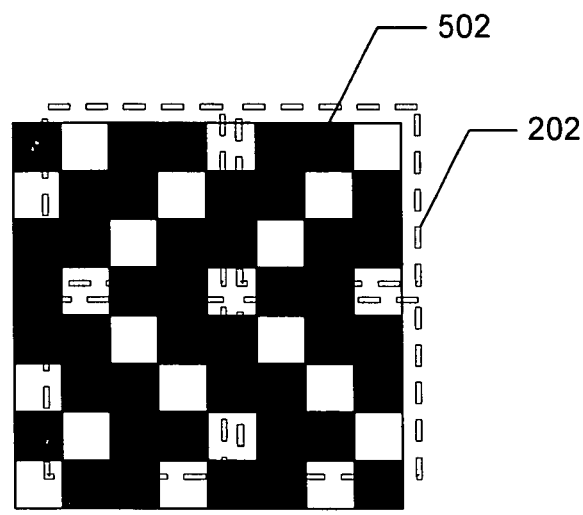
Figures 7A, 7B:
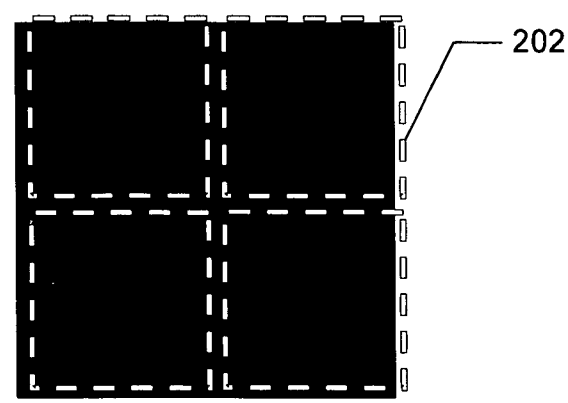

FIG. 3 illustrates a top view of an embodiment of an active screen system 300 with multiple voltage supplies (provided through traces 302-306), according to an embodiment. In various embodiments, the level of voltages supplied to the electrodes may be substantially the same or different to achieve a desired level of the optical characteristic of screen 104. In one embodiment, the system 300 illustrates further details of the system 200 of FIG. 2. More particularly, the system 300 illustrates further details of an active screen with a plurality of electrodes (e.g., electrodes 206 and 310) to drive one or more subpixels (e.g., 308). In an embodiment, the subpixels 308 may be utilized to provide a single projected pixel that covers the entire screen (such as the pixels 202 of FIG. 2).

As illustrated in FIG. 3, the subpixels 308 may be coupled to an electrode (e.g., electrodes 206 and 310). As illustrated in FIGS. 2 and 3, the electrodes (e.g., electrodes 206 and 310) may have a serpentine shape that follows a diagonal reversing path, e.g., to provide a dithering pattern with a uniform or substantially uniform dithering distribution. Each of the subpixels 308 may overlay an electrode portion that is about 1 mm wide, such as discussed with reference to FIG. 2. The serpentine electrodes (e.g., electrodes 206 and 310) may also serve to form the shape and area of the subpixel (308).

In one embodiment, the reflectance (or absorbance) of each subpixel (308) may be controlled by its corresponding voltage supply to which the subpixel is coupled, e.g., by varying the potential of the given voltage supply. For example, the voltage supply 304 is coupled to the subpixels 308 as illustrated in FIG. 3 and varying the potential of the voltage supply 304 will result in a change in reflectivity (or absorbance) of the subpixels 308, as will be further discussed herein for example with reference to FIGS. 4-10. Moreover, in the illustrated embodiment of FIG. 3, each of three separate power supplies (coupled to traces 302-306) is configured to control the potential one third of the traces (e.g., 206 and 310). In one embodiment, the power supplies that supply voltages through traces 302-306 may operate at the upper end of the allowed PDLC voltage range (e.g., of the active layer 116 of FIG. 1) to reduce distortion due to non-uniform PDLC thickness.

FIGS. 4-7 illustrate embodiments of enabled subpixel grayscale levels and corresponding subpixel dithering, according to various embodiments of the present disclosure. For example, the figures labeled with "A" (on the left hand side) illustrate the number of enabled subpixels (204) in the nine-subpixel configuration discussed with reference to FIGS. 2-3, where as the figures labeled with "B" (on the right hand side) illustrate the corresponding subpixel dithering patterns and resultant grayscale effect. In FIGS. 4A, 5A, 6A, and 7A, each of the digits illustrated within each subpixel (204) indicates the number of enabled subpixels due to an applied voltage potential level of the corresponding electrode (e.g., subpixel 308 coupled to the electrode 310 of FIG. 3). In FIGS. 4B, 5B, 6B, and 7B, each nine-subpixel block which corresponds to a region upon which a projected pixel (e.g., the pixel 202 of FIG. 2) will be formed is illustrated in the dotted boxes (202), where each activated subpixel (502) is black and non-activated subpixels are left blank (e.g., white).

Accordingly, as illustrated for the embodiments corresponding to FIGS. 4-7, four levels of grayscale (one for each of the FIGS. 4 through 7, respectively) may be realized with three voltage supplies (e.g., the voltage supplies 302-306 of FIG. 3). In some embodiments, additional levels of grayscale may be provided.

Additionally, adjustments may be made to several parameters to provide non-linear optical characteristics levels. The non-linear behavior may, in some embodiments, be selected to more closely match the non-linear response of the human eye. For example, the area of the electrodes (e.g., the electrodes 206 and 310 of FIG. 3), or trace widths, may be selected such that the degree of dithering, or effective grayscale, may be adjusted to provide for linear or non-linear grayscale reflectance (or absorbance). Also, a non-linear sequence (instead of a linear sequence that may be used for other embodiments) of voltage potential levels (302-306) for the subpixels (308) may be used for additional grayscale levels of active pixels (502).

Figure 8:
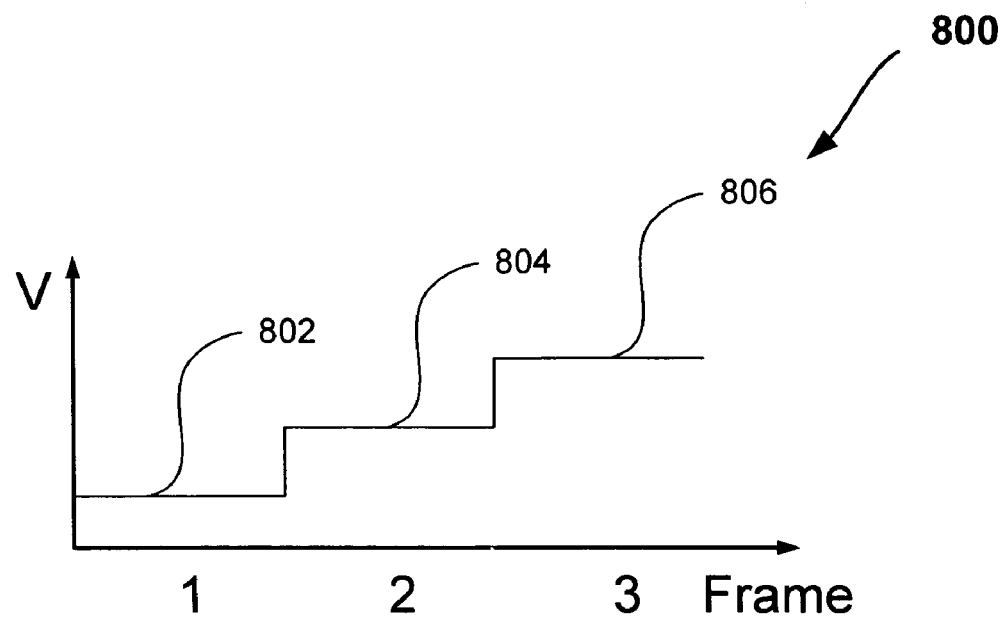
FIG. 8 illustrates an example of a graph of multiple electrode voltage levels provided by a voltage supply, according to an embodiment.

FIG. 8 illustrates a sample graph of multiple electrode voltage levels provided by a voltage supply, according to an embodiment. FIG. 8 illustrates that several voltage potential levels (802-806), during various frames (e.g., frames 1-3), may be utilized to provide three different (non-zero) grayscale levels for a screen (such as the screen 104 of FIGS. 1-2), where voltage levels 802, 804, and 806 may each provide low, intermediate, or maximum grayscale levels, respectively. Each of the voltage potential levels (802-806) may be provided by a voltage supply (e.g., the voltage supplies 302-306 of FIG. 3). Hence, by utilizing three positive voltage levels (802-806) and a 0V voltage level, each of the power supplies (e.g., the voltage supplies 302-306 of FIG. 3) may provide four individual grayscale levels for a screen (such as the screen 104 of FIGS. 1-2), thereby increasing the number of grayscale levels discussed with reference to FIGS. 4-7. The three voltage levels may provide encoding of 8 grayscale levels in a time sequence or 256 levels (e.g., 8 grayscale levels switch over a time sequence corresponding to switching the voltage supplies 302-306 of FIG. 3 over time).

Figure 9:
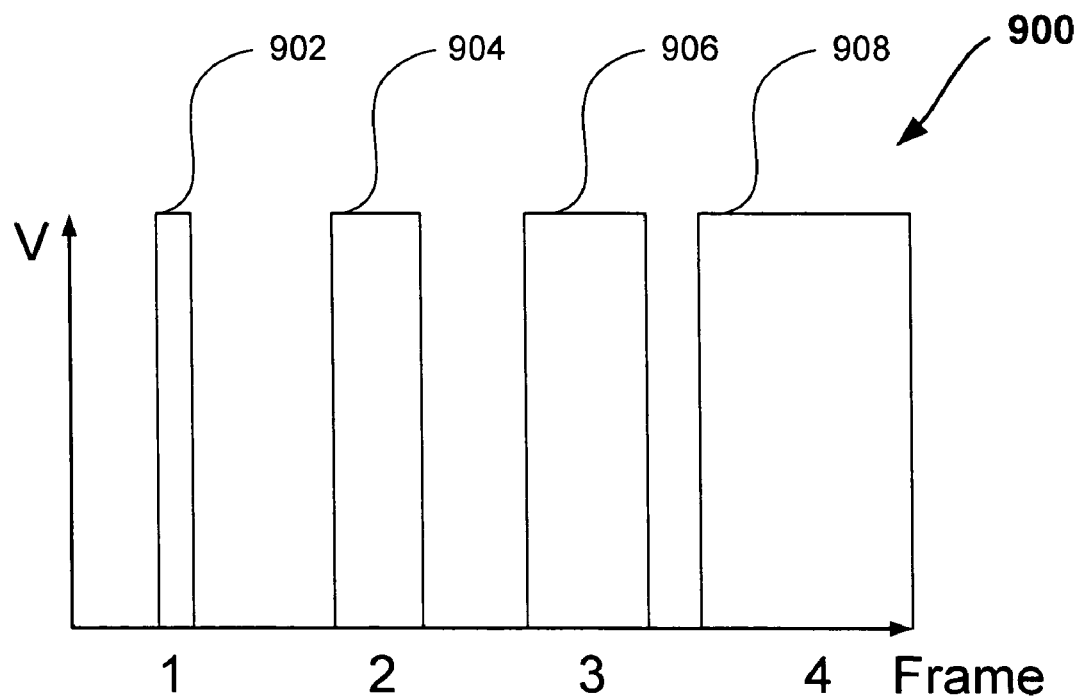
FIG. 9 illustrates an example of a graph of time-multiplexed voltage levels provided by a voltage supply, according to an embodiment.

FIG. 9 illustrates a sample graph of time-multiplexed voltage levels provided by a voltage supply, according to an embodiment. FIG. 9 illustrates that a voltage potential may be applied for different durations (902-908), during various frames (e.g., frames 1-4), to provide four different (non-zero) grayscale levels on a screen (such as the screen 104 of FIGS. 1-2). More particularly, by exposing the human eye to a gray level for differing time periods (e.g., the time period of each voltage potential 902-908 may be different), the eye may perceive different grayscale levels. Furthermore, the voltage levels 902-906 may provide various intermediate grayscale levels. The voltage level 908 may provide a maximum grayscale level that may reach the upper end of the allowed range of voltage operation for the active layer 116 of FIG. 1 (e.g., reach the full PDLC voltage operation). In one embodiment, uniform grayscale levels may be provided by the screen 104 of FIG. 1 by utilizing full rail-to-rail voltage operation of the PDLC, e.g., to reduce distortion due to non-uniform PDLC thickness.

Additionally, each of the voltage potentials (902-908) may be provided by a voltage supply such as the voltage supplies 302-306 of FIG. 3. Hence, by utilizing time-multiplexed voltage levels (902-908), each power supply (e.g., the voltage supplies 302-306 of FIG. 3) may provide 256 individual grayscale levels for a screen (such as the screen 104 of FIGS. 1-2), thereby increasing the number of grayscale levels discussed with reference to FIGS. 4-7. In various embodiments, the grayscale levels may be increased to 16.7 million, e.g., by providing an 8-bit resolution for the output voltages provided by each of the three power supplies discussed with reference to FIG. 3 (i.e. $(2^8)^3$).

Figure 10:
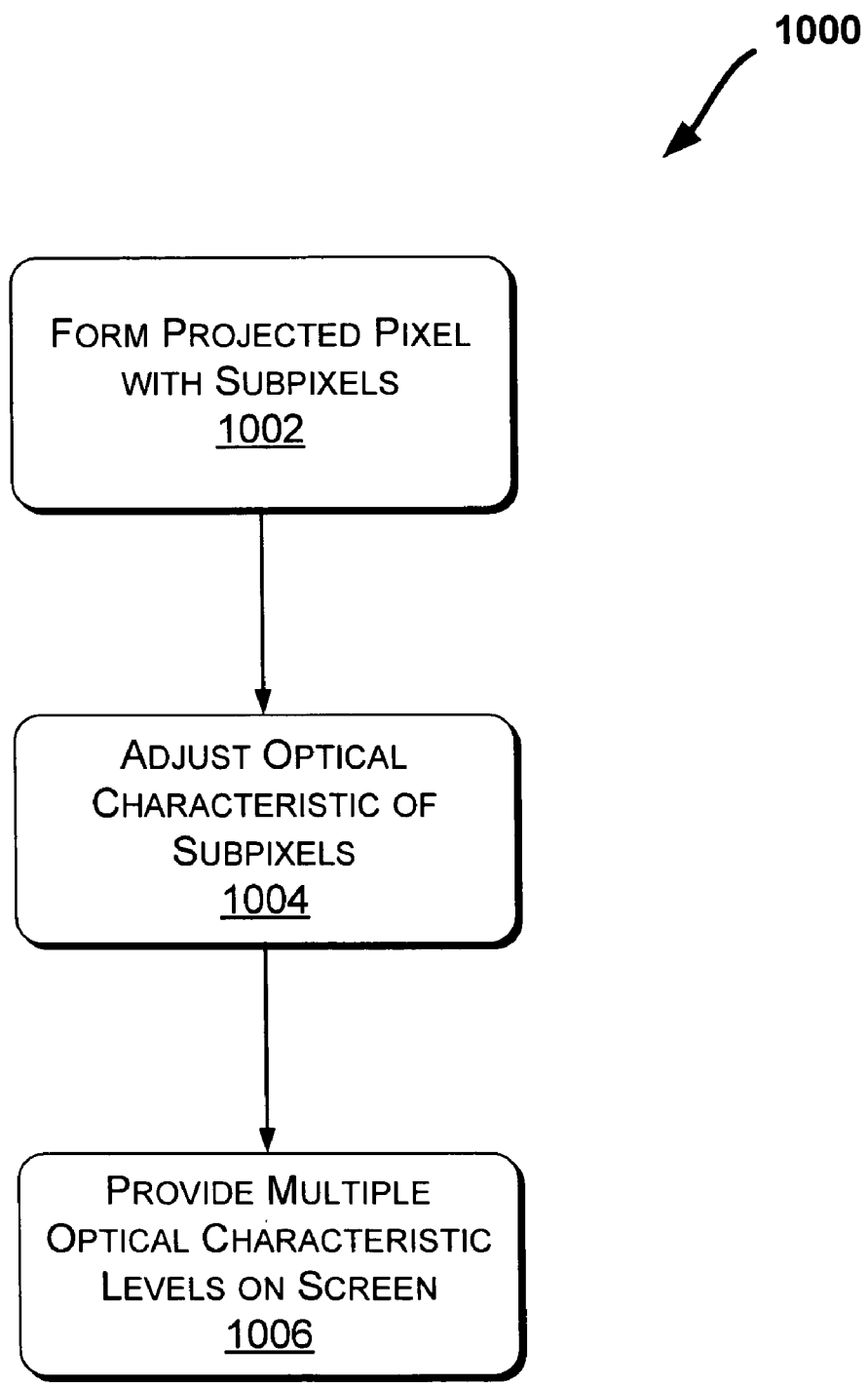
FIG. 10 illustrates an embodiment of a method for modifying an optical characteristic of a screen, according to an embodiment.

FIG. 10 illustrates an embodiment of a method 1000 for modifying an optical characteristic of a screen, according to an embodiment. For example, the method 1000 may be utilized to modify an optical characteristic (e.g., reflectivity and/or absorbance) of a portion of the screen 104 of FIG. 1 by providing various levels of the optical characteristic on the portion of the screen, such as discussed with reference to FIGS. 2-9. As discussed with reference to FIGS. 2-9, the voltage level applied to each subpixel may be adjusted to provide a dithering pattern (such as the reverse serpentine pattern illustrated in FIGS. 2-3).

As discussed with reference to FIG. 2, each projected pixel on the screen (e.g., the screen 104 of FIG. 1) may be projected onto an area of screen 104 corresponding to a plurality of subpixels (1002). In one embodiment (such as the one discussed with reference to FIGS. 2-7), each projected pixel may be formed by nine adjacent pixels (e.g., the subpixels 204).

The optical characteristic (e.g., reflectivity and/or absorbance) of one or more of the subpixel of the screen may be adjusted (1004), for example, by varying the voltage potentials applied to electrodes coupled to the plurality of subpixels (such as discussed with reference to FIG. 3). In one embodiment, the voltage potentials may be varied in magnitude for different image frames projected on the screen (such as discussed with reference to FIG. 8). Also, the voltage potentials may be multiplexed in time for different image frames projected on the screen (such as discussed with reference to FIG. 9). Accordingly, in an embodiment, the operation 1004 includes adjusting sets of one or more subpixels (e.g., subpixels coupled to the same electrode, such as subpixels 308 coupled to the electrode 310 such as discussed with reference to FIG. 3) within different ones of a plurality of groups of subpixels (such as the groups of subpixels discussed with reference to FIGS. 4A-5B) to have an optical characteristic so that the sets of one or more subpixels have the optical characteristic during a time interval (e.g., a frame such as discussed with reference to FIG. 8).

Adjusting the optical characteristic of each subpixel of the screen (1004) may provide a plurality of optical characteristic levels on the screen (1006). In one embodiment, the plurality of optical characteristic levels may be provided via dithering the plurality of subpixels (such as discussed with reference to FIGS. 4-7). Also, adjusting the electrical characteristic of each electrode coupled to each subpixel may increase a refresh rate of the screen (such as discussed with reference to FIG. 2). As illustrated in FIG. 3, the plurality of subpixels may be dithered in a reverse serpentine pattern (e.g., by utilizing the electrodes 260 and 310).

In one embodiment, the systems 100-300 of FIGS. 1-3, respectively, may include one or more processor(s) (e.g., microprocessors, controllers, etc.) to process various instructions to control the operation of the screen (104), the projector (102), and/or the projection system controller (106). The systems 100-300 may also include a memory (such as read-only memory (ROM) and/or random-access memory (RAM)), a disk drive, a floppy disk drive, and a compact disk read-only memory (CD-ROM) and/or digital video disk (DVD) drive, which may provide data storage mechanisms the processors.

One or more application program(s) and an operating system may also be utilized which may be stored in non-volatile memory and executed on the processor(s) discussed above to provide a runtime environment in which the application program(s) may run or execute.

Some embodiments discussed herein (such as those discussed with reference to FIG. 10) may include various operations. These operations may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or machine-readable media suitable for storing electronic instructions and/or data. Moreover, data discussed herein may be stored in a single database, multiple databases, or otherwise in select forms (such as in a table). For example, various computer-readable media may be utilized to adjust the optical characteristics of the subpixels (e.g., the subpixels 204 discussed with reference to FIGS. 2-7).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method comprising:
   adjusting sets of one or more subpixels within different ones of a plurality of groups of subpixels to have an optical characteristic so that the sets of one or more subpixels have the optical characteristic during a time interval, wherein the sets of the one or more subpixels within different ones of the plurality of groups of subpixels are arranged in a reverse serpentine pattern.

2. The method of claim 1, wherein the optical characteristic is one of a reflectivity or an absorbance.

3. The method of claim 1, wherein the adjusting the optical characteristic includes changing voltage potentials applied to electrodes coupled to the subpixels.

4. The method of claim 3, wherein the voltage potentials are varied in magnitude for different image frames projected on the screen.

5. The method of claim 3, wherein time periods during which voltage potentials applied to the electrodes during image frames are different for different ones of the image frames projected on the screen.

6. The method of claim 1, further comprising adjusting the electrical characteristic of one or more subpixels to increase a refresh rate of the screen.

7. The method of claim 1, wherein adjusting the optical characteristic comprises applying voltages to one or more electrodes coupled to the subpixels to change the optical characteristic of the sets of the one or more subpixels within the different ones of the plurality of groups of subpixels.

8. The method of claim 1, wherein the sets of one or more subpixels comprise equal numbers of the subpixels.

9. The method as recited in claim 1, further comprising, with the plurality of groups of subpixels included within a corresponding plurality of areas of a screen, illuminating the plurality of areas of the screen by a corresponding plurality of projected pixels.

10. An apparatus comprising:
a screen comprising a plurality of elements each having an adjustable optical characteristic and arranged into a plurality of groups; and
a plurality of electrodes, with individual ones of the plurality electrodes coupled to one or more of the elements included in different ones of the plurality of groups, wherein the plurality of electrodes have a reverse serpentine shape.

11. The apparatus of claim 10, wherein the screen is a rear projection screen or a front projection screen.

12. The apparatus of claim 10, wherein the optical characteristic is one of a reflectivity or an absorbance.

13. The apparatus of claim 10, wherein the plurality of electrodes are coupled to one or more voltage supplies.

14. The apparatus of claim 13, wherein at least two of the plurality of electrodes are coupled to a same one of the voltage supplies.

15. The apparatus of claim 10, further comprising a controller coupled to the screen to coordinate application of voltages by voltage supplies to the plurality of electrodes with the illumination of the plurality of groups by corresponding of the projected pixels.

16. The apparatus of claim 10, further comprising an electrode layer that comprises the plurality of electrodes, with the electrode layer configured to apply a voltage potential to select ones of the plurality of elements to provide a plurality of gray scales via dithering.

17. The apparatus of claim 10, wherein the one or more of the elements in the different ones of the plurality of groups comprise a corresponding plurality of sets of the elements, with the sets including equal numbers of the elements and with the plurality of groups for illumination by corresponding projected pixels.

18. A computer-readable medium comprising:
stored instructions to adjust sets of one or more subpixels within different ones of a plurality of groups of subpixels to have an optical characteristic so that the sets of one or more subpixels have the optical characteristic during a time interval; and
stored instructions to apply a voltage potential to select ones of the subpixels to provide a dithering configuration in a reverse serpentine pattern.

19. The computer-readable medium of claim 18, further comprising stored instructions to coordinate one or more operations of the screen.

20. A method comprising:
step for providing a plurality of projected pixels onto a screen having a plurality of subpixels on the screen in regions corresponding to each of the projected pixels;
step for causing an optical characteristic of one or more of the subpixels to change; and
step for dithering the plurality of subpixels in a reverse serpentine pattern.

21. An apparatus comprising:
means for adjusting an optical characteristic of one or more of subpixels of the screen for providing a plurality of optical characteristic levels on the screen, wherein an area corresponding to a projected pixel on the screen comprises a plurality of the subpixels; and
means for dithering the plurality of subpixels in a reverse serpentine pattern for providing the plurality of optical characteristic levels.

22. The apparatus of claim 21, further comprising means for coordinating one or more operations of the screen.

23. The apparatus of claim 21, further comprising means for applying a voltage potential to select ones of the plurality of the subpixels to provide a plurality of grayscale levels on the screen via dithering.

* * * * *